United States Patent [19]

Mori

[11] Patent Number: 4,678,279
[45] Date of Patent: Jul. 7, 1987

[54] METHOD OF PRODUCING A PHOTORADIATOR DEVICE

[76] Inventor: Kei Mori, 3-16-3-501, Kaminoge, Setagaya-ku, Tokyo, Japan

[21] Appl. No.: 490,685

[22] Filed: May 2, 1983

[30] Foreign Application Priority Data

| May 11, 1982 | [JP] | Japan | 57-78809 |
| May 11, 1982 | [JP] | Japan | 57-78810 |
| Jun. 7, 1982 | [JP] | Japan | 57-97459 |
| Jun. 10, 1982 | [JP] | Japan | 57-99775 |

[51] Int. Cl.$^4$ .............. G02B 00/00; B26D 3/06; C03B 9/46
[52] U.S. Cl. .............. 350/320; 350/96.10; 350/96.29; 350/96.30; 83/875; 83/880; 83/51; 65/174; 65/176
[58] Field of Search .............. 65/174, 176; 83/879, 83/880, 883, 884, 885, 917, 875, 876, 877, 878, 51; 350/96.10, 96.15, 96.20, 96.29, 96.30, 320, 172, 168, 258, 259, 260, 261, 262, 263, 264, 265; 250/227; 40/427; 362/32, 346, 347, 307

[56] References Cited

U.S. PATENT DOCUMENTS

| 2,615,286 | 10/1952 | Descarsin | 65/174 |
| 2,909,857 | 10/1959 | Wilson | 40/546 |
| 3,060,319 | 10/1962 | Greunke | 250/227 |
| 3,120,163 | 2/1964 | Gittler | 362/307 |
| 3,299,306 | 1/1967 | Kapany | 350/96.15 |
| 3,610,941 | 10/1971 | West | 250/227 |
| 3,829,675 | 8/1974 | Mariani | 350/96.1 |
| 4,422,719 | 12/1983 | Orcutt | 350/96.1 |
| 4,459,642 | 7/1984 | Mori | 350/96.1 |
| 4,576,436 | 3/1986 | Daniel | 350/96.10 |
| 4,580,195 | 4/1986 | Mori | 362/32 |
| 4,585,298 | 4/1986 | Mori | 350/96.10 |
| 4,626,065 | 12/1986 | Mori | 350/96.15 |

FOREIGN PATENT DOCUMENTS

| 1325014 | 3/1963 | France | 362/32 |
| 56-32104 | 4/1981 | Japan | 350/96.1 |

Primary Examiner—William L. Sikes
Assistant Examiner—Brian M. Healy
Attorney, Agent, or Firm—Jordan and Hamburg

[57] ABSTRACT

A photoradiator in the form of an elongate light conducting member is formed with at least one strip of light diffusing material, spiral groove or annular groove, which serves as light radiating means. Light input into one end of the light conductor is routed therethrough to be radiated radially outwardly of the light conductor by the radiating means. Despite a small diameter and flexibility of the light conductor, the grooves, either spiral or annular, are formed accurately and efficiently with the light conductor held stable in position. The light radiation efficiency is increased by a flat reflector located at the other end of the light conductor, the pitch of the radiating means which progressively decreases toward the other end of the light conductor, and/or, in the case of grooves, the depth of the radiating means which progressively increases toward the other end of the light conductor. A protective casing hermetically encloses the periphery of the light conductor at a spacing therefrom.

4 Claims, 11 Drawing Figures

Fig. 4
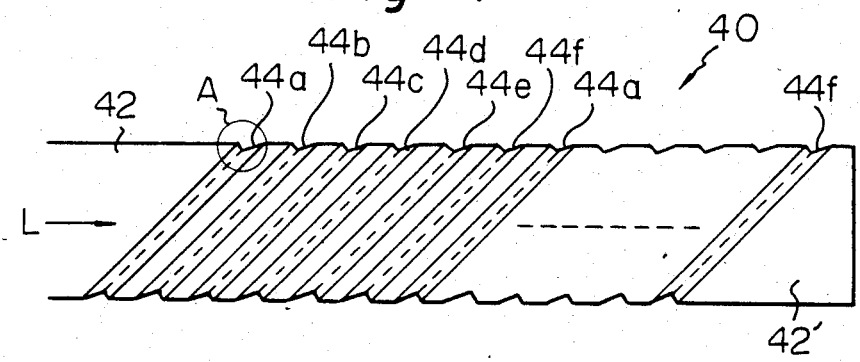
Fig. 5
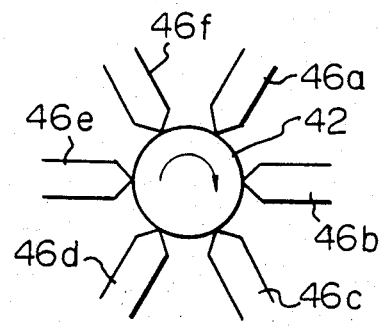
Fig. 6a    Fig. 6b    Fig. 6c
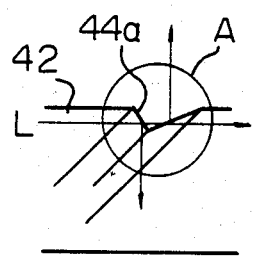 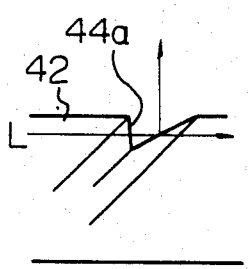 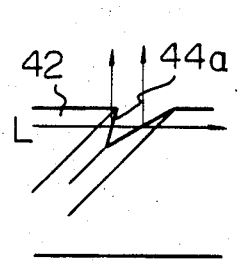

METHOD OF PRODUCING A PHOTORADIATOR DEVICE

BACKGROUND OF THE INVENTION

The present invention relates to a photoradiator for effectively radiating light to the ambience which is routed through a fiber optic cable or the like and a method of producing such a photoradiator.

Effective use of solar energy is the key to energy saving today and has been studied in various fields actively. For the most effective use of solar energy, solar energy has to be availed as it is without being transformed into another kind of energy such as thermal energy or electrical energy. In light of this, I have made various proposals for an illumination system which utilizes solar energy. The illumination system employs a fiber optic cable through which the sunlight converged by a lens or the like is conducted to a desired location to stream out thereat to illuminate the ambience.

In the illumination system of the type described, the light advancing through the fiber optic cable has directivity. Therefore, if the light is output at a simple cut end of the cable, it becomes radiated over an angle $\theta$ which is usually as small as about 46°. The light streaming through the simple cut end of the cable would fail to evenly illuminate a desired space such as a room. I have proposed in various forms a photoradiator which is designed to effectively diffuse light conducted by a fiber optic cable to provide even illumination over a wide range.

The present invention constitutes a further improvement over such predecessors.

SUMMARY OF THE INVENTION

It is an object of the present invention to provide a photoradiator which effectively radiates light routed through a light conducting member thereof to the ambience.

It is another object of the present invention to provide a method of producing a photoradiator of the type described which is capable of producing such a photoradiator accurately and efficiently while maintaining it stable in position.

It is another object of the present invention to provide a generally improved photoradiator and method of producing the same.

In one aspect of the present invention, there is provided a photoradiator which comprises an elongate light conducting member for conducting converged light through an optical path which extends from one end to the other end thereof, and light radiating means for radiating the light radially outwardly from the optical path to a space which surrounds the photoradiator.

In another aspect of the present invention, there is provided a method of producing a photoradiator for radiating light conducted therethrough to the ambience, which comprises the steps of supporting an elongate light conducting member in at least one radial direction of the light conducting member, and machining the periphery of the light conducting member to shape at least one groove or recess so that the light advancing through the light conducting member becomes radiated by reflection at a wall of the groove.

In accordance with the present invention, a photoradiator in the form of an elongate light conducting member is formed with at least one strip of light diffusing material, spiral groove or annular groove, which serves as light radiating means. Light input into one end of the light conductor is routed therethrough to be radiated radially outwardly of the light conductor by the radiating means. Despite a small diameter and flexibility of the light conductor, the grooves, either spiral or annular, are formed accurately and efficiently with the light conductor held stable in position. The light radiation efficiency is increased by a flat reflector located at the other end of the light conductor, the pitch of the radiating means which progressively decreases toward the other end of the light conductor, and/or, in the case of grooves, the depth of the radiating means which progressively increases toward the other end of the light conductor. A protective casing hermetically encloses the periphery of the light conductor at a spacing therefrom.

These and other objects, features and characteristics of the present invention will become more apparent from the following description taken with the accompanying drawings.

BRIEF DESCRIPTION OF THE DRAWINGS

FIG. 4 is a fragmentary side elevation of a third embodiment of the present invention;

FIG. 5 is a plan view of the photoradiator of FIG. 4 and tools for machining it;

FIGS. 6a–6c are fragmentary views of the photoradiator of FIG. 4 and showing various channel configurations applicable thereto;

DESCRIPTION OF THE PREFERRED EMBODIMENTS

While the photoradiator and method of producing the same of the present invention are susceptible of numerous physical embodiments, depending upon the environment and requirements of use, substantial numbers of the herein shown and described embodiments have been made, tested and used, and all have performed in an eminently satisfactory manner.

Figure 1:
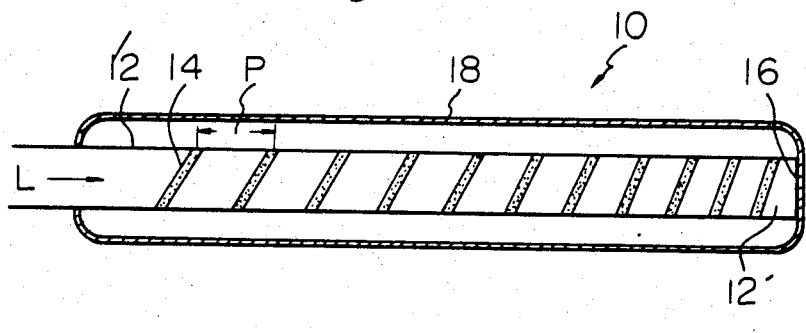
FIG. 1 is a sectional side elevation of a photoradiator embodying the present invention.

Referring to FIG. 1 of the drawings, a photoradiator embodying the present invention is shown and generally designated by the reference numeral 10. The photoradiator 10 includes an elongate cylindrical light conducting member 12 for defining an optical path which extends from one end (not shown) to the other end 12' of the light conductor. Light L from the input end of the light conductor 12 is routed through the optical path to the output end 12' as indicated by an arrow in the drawing. A spiral strip of light diffusing material 14 is formed on the periphery of the light conductor 12 by sputtering and has a refractive index which is larger than that of the light conductor 12. In this construction, the light L will be effectively radiated to the outside via the light diffusing spiral strip 14 serving to illuminate a room, for example.

The spiral 14 has a pitch P which may either be even to the end 12' of the light conductor 12 or progressively reduced toward the end 12' i.e., along the direction of light conduction. Still, the progressively reduced pitch distribution will be advantageous over the even pitch distribution in view of the fact that the light intensity would otherwise decrease toward the end 12' of the light conductor 12.

A flat reflector 16 is mounted on the light output end 12' of the conductor 12. The reflector 16 will reflect the light incident thereon so that this part of the light L will be radiated radially through the light diffuser 14 together with the other part of the light L. This will enhance the diffusion efficiency and thereby effective illumination for a desired space. If desired, the reflector 16 may be replaced by the end 12' of the light conductor 12 which is treated to function in the same way as the reflector 16.

An enclosure or casing 18 is made of a transparent or semitransparent material and configurated to hermetically cover the light conductor 12 and spiral strip 14. The casing 18 protects the surface of the light conductor 12 from damage due to contact thereof with another object or from contamination due to dust and thumbs. Meanwhile, in the event the photoradiator 10 serves as an underwater light source such as in a chlorella culturing bath, the casing 18 will free the light conductor 12 from deposition of fur and thereby maintain it always clean. Another advantage attainable in such a case is that the light streaming out from the light diffuser 14 will be radiated into the surrounding water by way of the air layer within the casing 18 and thereby allowed to scatter itself over a desired range and in a desired direction. Should the casing 18 be absent when the photoradiator 10 is used under water, the light would come out only through a very narrow range at the end portion of the fiber optic cable.

Figure 2:
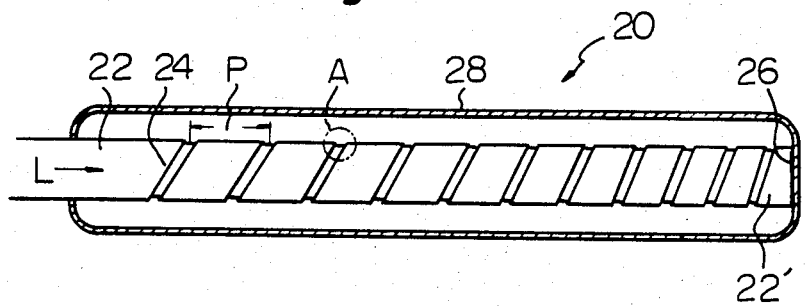
FIG. 2 is a view similar to FIG. 1 but showing a second embodiment of the present invention.

Referring to FIG. 2, a second embodiment of the present invention is shown and comprises a photoradiator 20. The photoradiator 20 has a light conducting member 22 which, like the photoconductor 12, defines an optical path extending from one end (not shown) to the other end 24' thereof. Light L from the input end of the light conductor 22 propagates through the optical path to the output end 22' as indicated by an arrow in the drawing. The construction described so far is common to the construction of FIG. 1.

A characteristic feature of the photoradiator 20 is that a groove or recess 24 extends spirally to the end 22' of the light conductor 22.

Figure 3:
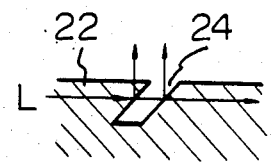
FIG. 3 is a fragmentary section of the photoradiator shown in FIG. 2.

As best shown in FIG. 3 which is an enlarged section of an encircled portion A of FIG. 2, the spiral groove 24 has a generally rectangular cross-section so that the light beam L advancing through the light conductor 22 is reflected by the walls of the groove 24 and thereby effectively radiated to the ambience to serve a desired purpose such as illumination. The spiral groove 24, like the spiral strip 14 of FIG. 1, has a pitch which may either be even to the end 22' of the light conductor 22 or progressively reduced toward the end 22', although the latter pitch distribution will be advantageous over the former for the reason already discussed in conjunction with the spiral strip 14.

A flat reflector 26 is fit on the light output end 22' of the conductor 22 while the whole assembly is enclosed in an enclosure or casing 28. Again, the reflector 26 may be omitted if the end 22' of the light conductor 22 is treated to reflect light incident thereon. The reflector 26 or 22' and the casing 28 are desirable from the previously described standpoints.

Although not shown in the drawings, the spiral groove 24 in the light conductor 22 is formed by placing the cutting edge of a tool in contact with the periphery of the workpiece 22. One of the tool and workpiece 22 will be moved along the axis of the light workpiece 22 while the other will be rotated about the axis of the light workpiece 22.

Referring to FIG. 4, a third embodiment of the present invention is shown. A photoradiator 40 comprises an elongate cylindrical light conducting member 42 formed with at least three spiral grooves which extend parallel to each other and have a generally triangular or wedge-shaped cross-section. In this particular embodiment, six spiral grooves 44a-44f are shown as extending toward the light output end 42' of the light conductor 42.

As demonstrated in FIG. 5, the photoradiator 40 with the six parallel grooves 44a-44f is cut by six tools 46a-46f whose cutting edges are abutted against the periphery of the light conductor 42 at different positions along a circumference of the latter. While one of the tools 46a-46f and workpiece 42 is rotated about the axis of the latter, the other is moved up or down along the axis of the workpiece 42 so that the tools 46a-46f cut the spiral grooves 44a-44f in the workpiece 42 while supporting it stably at the six positions.

FIGS. 6a-6c are fragmentary enlarged sections of part of the photoradiator 40 indicated by a circle A in FIG. 4 representing a countermeasure against the uneven light intensity distribution along the length of the light conductor 42. As shown, the depth of the spiral grooves 44a-44f (represented by 44a in FIGS. 6a-6c) is sequentially increased toward the conductor end 42' by controlling the cutting depth of each tool in the radial direction of the conductor 42. In this structure, the light L advancing through the conductor 42 in parallel with the axis of the latter will be partly reflected by the wall or walls of the spiral groove 44a to illuminate the ambience and the rest will be directed downwardly to be radiated in the same manner by the next groove wall or walls. The light, in practice, is the light which has been converged by suitable means such as a lens and, accordingly, it will be effectively diffused in various directions from the grooves. It will be apparent that such effective radiation of the light L occurs even if the direction of light propagation is opposite.

Another possible countermeasure against the uneven light intensity distribution is progressively reducing the pitch, i.e., increasing the density of the spiral grooves toward the conductor end 42'. This is attainable by controlling the rotation speed of the light conductor 42 or the tools 46 or the moving speed of the same along the axis of the light conductor 42.

It will be seen that the multi-point support provided by the tools 46a-46f for the workpiece 42 permits the grooves 44a-44f to be cut stably and efficiently while holding the axis of the workpiece 42 substantially fixed in position. The grooves, therefore, can be accurately cut in the workpiece 42 even though the workpiece may be small in diameter or flexible. The stability of the workpiece 42 will be further enhanced if it is positioned vertically and under a suitable magnitude of tension.

Figure 7:
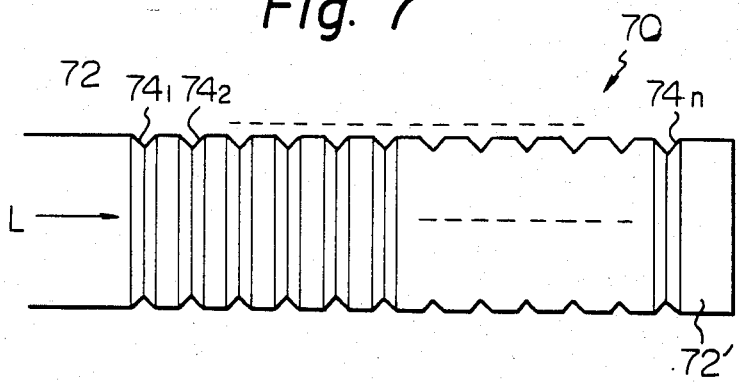
FIG. 7 is a side elevation of a fourth embodiment of the present invention.

Referring to FIG. 7, a fourth embodimet of the present invention is shown. A photoradiator 70 comprises a cylindrical light conducting member 72 which is formed with a number of annular grooves $74_1$-$74_n$ at spaced locations along the axis thereof. Each groove 74 is shown as having a generally triangular or wedge-shaped cross-section.

Figure 8:
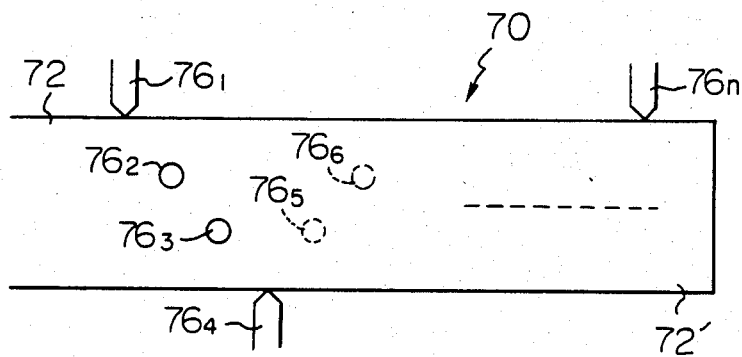
FIG. 8 is a diagram corresponding to FIG. 7 and showing positions of tools relative to the photoradiator.
Figure 9:
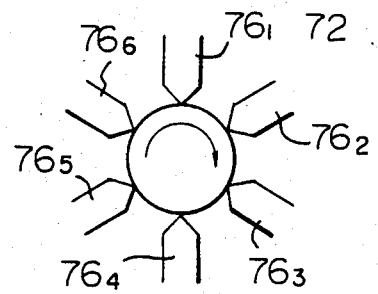
FIG. 9 is a plan view of the photoradiator and tools shown in FIG. 8.

A method of forming such grooves $74_1$-$74_n$ in the light conductor 72 is illustrated in FIGS. 8 and 9. Tools $76_1$-$76_n$ corresponding in number to the grooves $74_1$-$74_n$ are abutted against the periphery of the workpiece 72 at spaced positions along the axis of the workpiece 72 but distributed to three planes which intersect each other at the axis of the workpiece 62, as shown in FIG. 9, although the purport of the embodiment is to support the workpiece 72 in at least three directions. With this multi-point support, either the workpiece 72 or the tools $76_1$-$76_n$ are rotated relative to the other to simultaneously cut the annular grooves $74_1$-$74_n$ in the workpiece 72.

The light propagating through the photoradiator 70 thus constructed will be radiated to the ambience as efficiently as the light through the photoradiator 40 in the manner described with reference to FIGS. 6a-6c. Again, the multi-point support provided by the tools $76_1$-$76_n$ will realize efficient and accurate machining of the workpiece 72. The optional features concerning the pitch and depth of the grooves described are also applicable to the workpiece 72.

In summary, it will be seen that the present invention provides a photoradiator which, despite its simple and economical construction, effectively radiates light which is usable for illumination or like purpose. The photoradiator can be machined to have light radiating means accurately and efficiently thereon even if it is flexible and small in diameter.

Various modifications will become possible for those skilled in the art after receiving the teachings of the present disclosure without departing from the scope thereof. For example, the reflector 16 or 12' and the casing 18 or 28 may both be omitted and/or applied also to the third and fourth embodiments. The light radiating means in the form of the spiral strip 14, spiral groove 24 or spiral grooves 44 may be cut in the workpiece in such a manner as to intersect other identical strips or grooves. In the case of the spiral grooves, such a configuration may be achieved by one reciprocation of the workpiece or the tools along the axis of the workpiece.

What is claimed is:

1. A method of producing a photoradiator for radiating converged light conducted therethrough radially outwardly to the ambience, comprising the steps of:
   (a) supporting an elongate light conducting member means with its longitudinal axis substantially vertically disposed;
   (b) supporting said vertically disposed elongate light conducting member means simultaneously at a plurality of axially spaced and a plurality of circumferentially spaced locations of the light conducting member means by axially spacing a plurality of cutting tool member means at substantially equal axial distances from each other along the axial length of said light conducting member means and circumferentially spacing said plurality of cutting tool member means at substantially equal angular distances from each other about the circumference of said light conducting member means by placing the cutting edges of said plurality of cutting tool member means in contact with the periphery of the light conducting member means at said plurality of axially and circumferentially spaced locations of said light member means;
   (c) machining the periphery of the vertically disposed light conducting member means simultaneously at a plurality of axially and circumferentially spaced locations of the light conducting member means utilizing said cutting edges of said plurality of cutting tool member means to simultaneously form a plurality of grooves in said light conducting member means so that the light advancing through the light conducting member means becomes radiated by reflection at a wall of said grooves, whereby said cutting tool member means holds the axis of said light conducting member means substantially fixed in position during said machining; and
   (d) tensioning said light conducting member means during said machining step.

2. A method as claimed in claim 1 wherein said grooves have a substantially wedge-shaped cross sectional configuration.

3. A method as claimed in claim 1 wherein said grooves have a substantially triangular cross sectional configuration.

4. A method as claimed in claim 1 wherein there are six of said cutting tool member means.

* * * * *